Feb. 10, 1970 R. M. WILCOX 3,494,673
CLEANING DEVICE FOR AN EXPOSED BEARING SURFACE
Filed March 10, 1967 5 Sheets-Sheet 1

INVENTOR.
Roy M. Wilcox
BY
Att.

INVENTOR.
Roy M. Wilcox
BY
M. A. Hobbs
Att.

Feb. 10, 1970 — R. M. WILCOX — 3,494,673
CLEANING DEVICE FOR AN EXPOSED BEARING SURFACE
Filed March 10, 1967 — 5 Sheets-Sheet 3

INVENTOR.
Roy M. Wilcox
BY
M. A. Hobbs
Att.

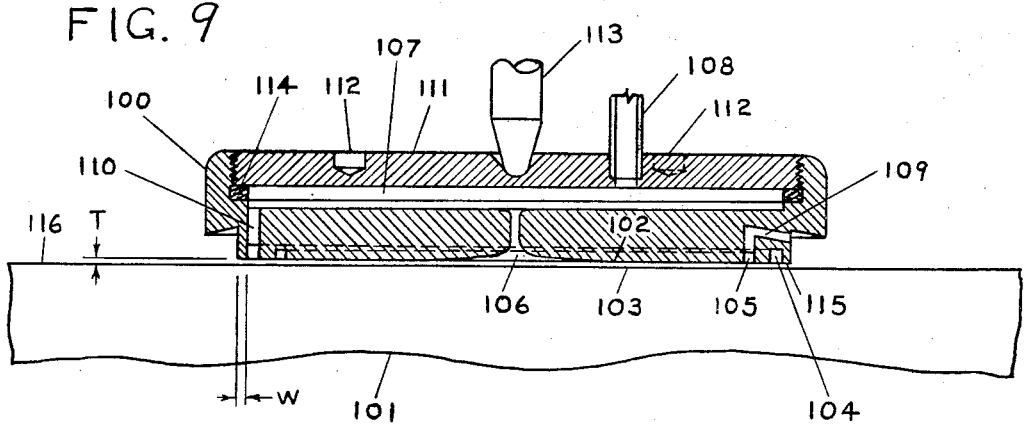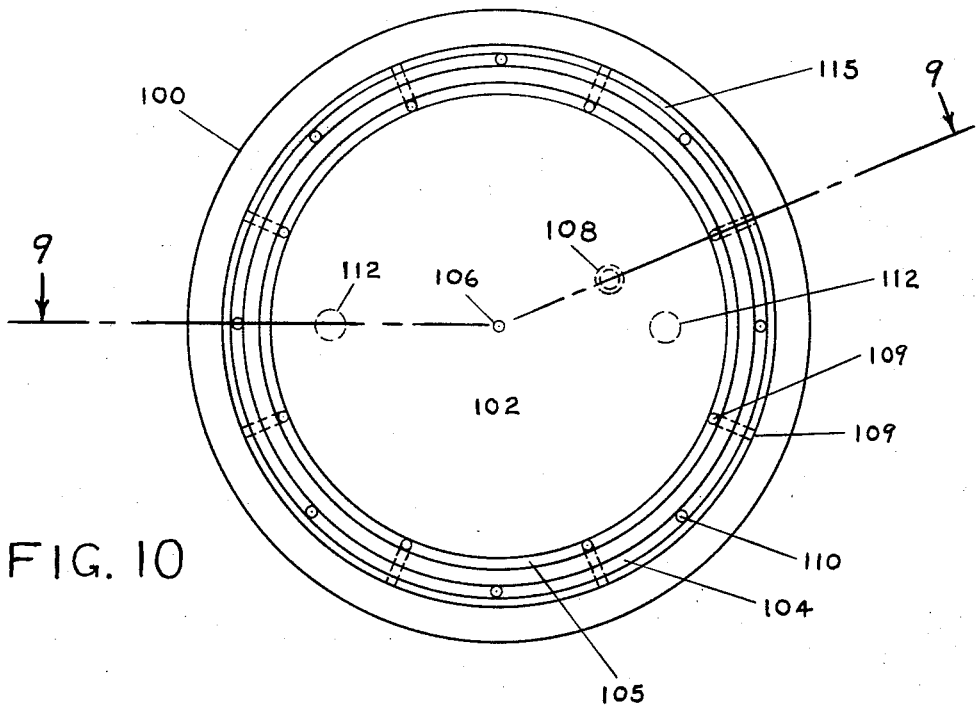

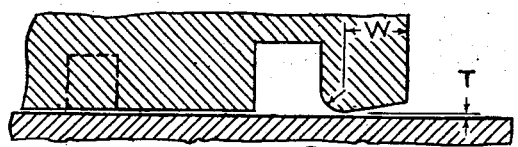
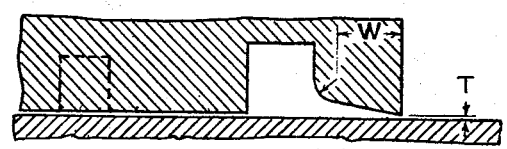
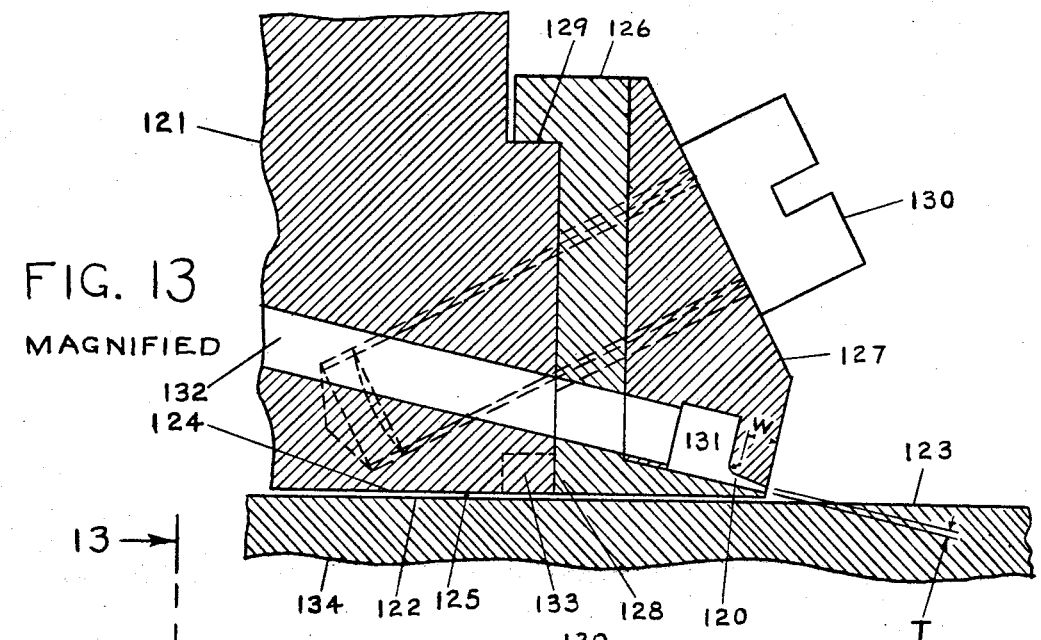
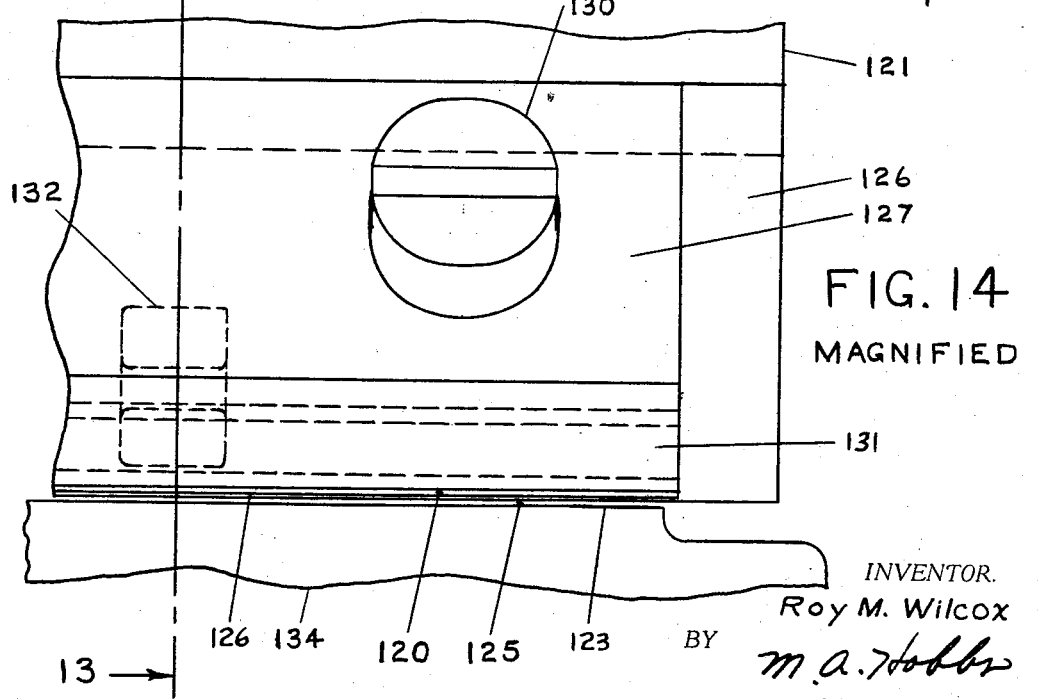

United States Patent Office 3,494,673
Patented Feb. 10, 1970

3,494,673
CLEANING DEVICE FOR AN EXPOSED BEARING SURFACE
Roy Milton Wilcox, 2803 Locust Lane,
South Bend, Ind. 46615
Continuation-in-part of application Ser. No. 459,377,
May 27, 1965, which is a continuation-in-part of application Ser. No. 221,176, Sept. 4, 1962. This application Mar. 10, 1967, Ser. No. 622,201
Int. Cl. F16c *17/00, 41/00, 29/00*
U.S. Cl. 308—3.5          28 Claims

ABSTRACT OF THE DISCLOSURE

For machine ways or other exposed bearing surfaces, a nozzle having a very thin wide opening for projecting a high velocity sheet of air or other lubricant outwardly from the smaller bearing member along the exposed surface to remove fine abrasive particles before engagement of the bearing surfaces.

---

This invention relates to both way guards and bearing seals but is more accurately termed a cleaning device for an exposed bearing surface; and this application is a continuation-in-part of my co-pending U.S. patent application Ser. No. 459,377, filed May 27, 1965, which in turn is a continuation-in-part of my U.S. patent application Ser. No. 221,176, filed Sept. 4, 1962, now U.S. Patent No. 3,186,774. After filing U.S. patent application Ser. No. 622,201, U.S. patent application Ser. No. 459,377 was abandoned.

Hydrostatic bearings, which use either pressure gas or liquid to prevent contact between the bearing surfaces inherently have an unlimited life except when contaminated. In addition, hydrostatic gas bearings have a limited film thickness, as described in the above U.S. patent, a typical half load film thickness being .005 inch. Furthermore, thin film hydrostatic gas bearings are especially useful in very accurate instruments and machinery because of their essentially zero friction and wear and constant film thickness in respect to bearing velocity. Because of the necessarily high price of and very thin films in such instruments and machinery, it is essential that all contaminating particles larger than the above film thickness be filtered from the pressure fluid supplied to the bearing and that similar particles be removed from an exposed bearing surface before engagement with the opposite bearing surface. Usually outward flow from hydrostatic bearings that do not have exposed surfaces, will exclude contamination.

The ultimate object of the invention is therefore to provide a device that will exclude all contamination from a bearing. However, the invention is particularly useful with gas and liquid hydrostatic bearings having a linear of random motion. It can also be used with any type of rotating bearing where it is economical to provide a filtered pressure fluid for cleaning an exposed surface. That is, the invention is particularly useful where one bearing surface is more extensive than the other, is exposed to contaminant and subsequently engages the opposite bearing member.

The principal object of the invention is to forcefully accelerate and remove from the exposed surface very fine hard particles comparable in size to the bearing's film thickness, for example grinding dust, before the edge of the less extensive bearing surface can overtake them. If these particles are allowed to engage a fast moving sliding or rolling bearing member, way guard or seal, each particle larger than the lubricating film space gouges out paths in and/or buries itself in the bearing surfaces, way guard or seal, thereby creating friction, wear and loss of bearing accuracy. Particles softer than the material of the bearing surfaces, way guard or seal are crushed thereby eroding the bearing surfaces, way guard or seal. The result of this is also a loss of accuracy.

The above strong acceleration of contaminant is accomplished by high velocity blowing or flushing and, if necessary, brushing the exposed surface, for a sufficient distance in front of the less extensive bearing member to provide time for accelerating the contaminant to greater than bearing velocity before it reaches or is reached by the less extensive bearing member.

Another important object of the invention is to accomplish this extended, high velocity blowing or flushing across the entire width of the exposed surface, with minimum flow and energy consumption. In this invention flow is minimized by restricting the thickness of the fluid jet to that of the opening between the bearing members, which for gas bearings is very small as described in column 1.

At many points in the design of machinery it is undesirable, impractical or impossible to mechanically seal in or to collect the lubricant from a bearing, especially a slide. It is therefore an important purpose of the invention to employ pressure air which may be allowed to escape, to clean an exposed bearing surface, and/or to divert a strong inward flow of contaminant, and to lubricate the associated bearing.

This is accomplished by combining the air powered cleaning device described herein with an hydrostatic air bearing. Additional advantages of this combination are that it only requires one fluid source and that the two fluid streams from the bearing and from the cleaning device may be allowed to mix.

A further object of the invention is to provide a device that is easily disassembled for inspection, cleaning or replacement.

These and other objects and features of the invention will become apparent from the following description taken in conjunction with the accompanying drawings, in which:

FIGURE 9 is a fragmentary cross section of the cleaning device and bearing member shown in FIGURE 10 and is taken along the line 9—9;

FIGURE 10 illustrates the application of the invention to the less extensive member of an hydrostatic gas thrust bearing, capable of random motion in one plane;

FIGURE 11 is a fragmentary cross section of a nozzle design used for liquids;

FIGURE 12 is a fragmentary cross section of a nozzle design used for gases;

FIGURE 13 is a fragmentary magnified cross section of the alternative shown in FIGURE 14 and is taken along the line 13—13;

FIGURE 14 is a fragmentary magnified view of an alternative form of the invention employing a self-contained nozzle attached to the bearing.

In an hydrostatic bearing a continuous unbroken lubricating gas or liquid film is supported or maintained by pressure fluid flow through a restriction, hereinafter called the R1 restriction, between the filtered pressure fluid source and the film. The pressure fluid escapes from the bearing at the bearing perimeter and the passage or restriction, hereinafter called the R2 restriction, through which the pressure fluid escapes is dependent on the separation of the bearing members, that is film thickness, which of course varies under bearing loading. At maximum load the bearing members are lightly contacting.

Using air as a lubricant, it may be allowed to escape to the atmosphere. However using most other fluids, it is necessary or desirable to provide means adjoining the bearing for collecting the exhausted fluid.

The characteristic of an hydrostatic bearing is that as soon as fluid pressure is applied to the bearing the bearing surfaces are completely separated by a continuous filtered fluid film. The thickness of this film is regulated by the interaction of the above R1 and R2 restrictions as described in U.S. Patent 2,683,635 and illustrated in FIGURE 19 thereof.

Figure 1:
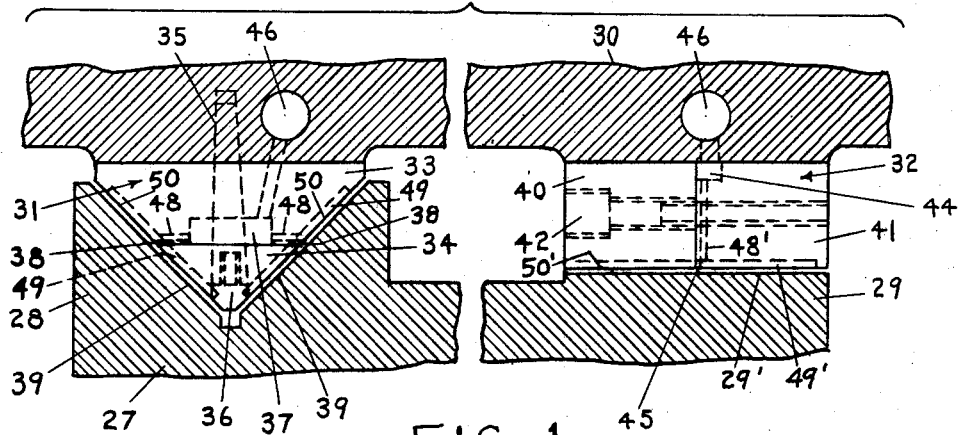
FIGURE 1 is a transverse, fragmentary vertical sectional view showing the application of the invention to hydrostatically lubricated ways of, for instance, a grinding machine.
Figure 2:
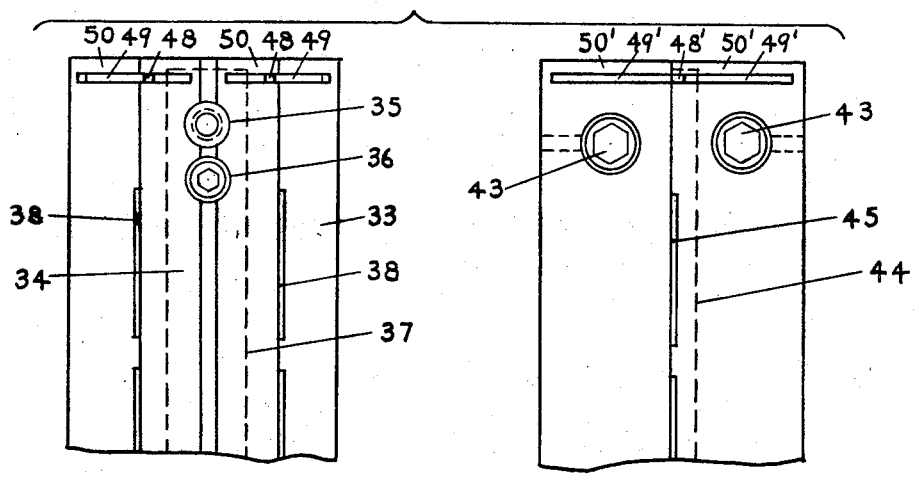
FIGURE 2 is a fragmentary underside plan view of the way members of the carriage of FIGURE 1.

FIGURES 1 and 2 illustrate the invention applied to slot type hydrostatic way bearings described in U.S. Patent 3,186,774. In these figures, the numeral 27 represents the bed of a machine having a V-way 28 and a flat way 29. The carriage 30 of the machine has way members generally designated at 31 and 32 for operating along the machine ways 28 and 29. The way member 31 is formed of component members 33 and 34, which are precisely related to the carriage 30 by tapered pins 35 which have threaded holes in their outer ends for their extraction.

Countersunk socket head screws 36 hold the precisely ground way components or pieces 33 and 34 to the carriage and seal supply channel 37 defined between the way components. The way components are formed to present on assembly with the carriage linear R1 slot formations 38, extending longitudinally of and disposed centrally between the edges of the opposing faces 39 of the V-way 28.

The way member 32 comprises the component way members or pieces 40 and 41, which pieces have their top and bottom surfaces ground precisely parallel so that their sideways position need not be precise.

Countersunk socket head screws 42 hold the way members 40 and 41 together, and similar screws hold the members to the carriage 30. The component way members 40 and 41 are formed to provide on assembly with the carriage a supply channel 44 from which leads an R1 slot formation 45 extending centrally and longitudinally of the flat way 29 to deliver compressed gas from the channel 44 to between the carriage way member 32 and the way 29. Suitable supply passages 46 may be formed in the carriage 30 for supplying compressed gas to the respective supply channels 37 and 44.

Pressure gas from the channels 37 and 44 is also distributed through large openings 48 and 48' to large plenum grooves 49 and 49' in the way members 31 and 32 respectively, so as to maintain supply pressure in the grooves regardless of bearing load so that gas pressure vibration at this point is not possible. This pressure gas escapes past lips 50 and 50' at both ends of the carriage 30, at high velocity in a thin sheet along way surfaces 39 and 29'. When the bearing is in motion, these fluid sheets sweep contamination off of the exposed surfaces 29' and 39 ahead of carriage 30, thereby excluding dust and dirt from the film spaces.

Thus essential elements in this form of the invention are the plenum grooves 49 and 49', the lips 50 and 50' and the opposite bearing surfaces 39 and 29' which together form nozzles with thin elongated openings parallel to the way surfaces. The length of the fluid sheets in the direction of flow depends on proper contouring as shown in FIGURES 11 and 12 and on the above mentioned thickness of the openings which in turn is precisely regulated by the design of the above described hydrostatic bearings.

Figure 3:
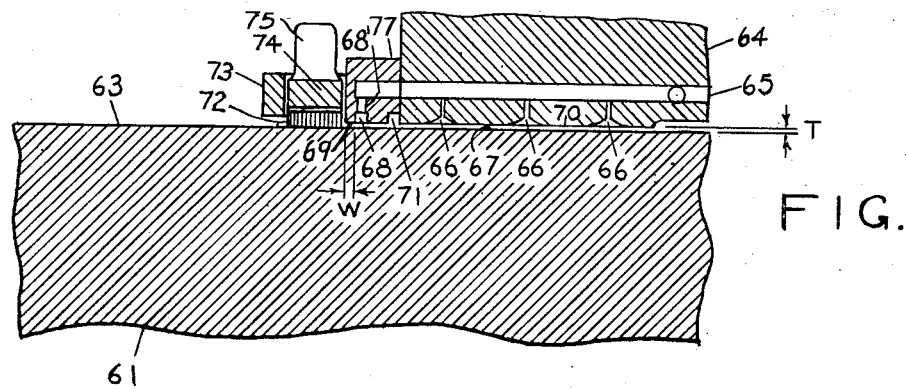
FIGURE 3 is a longitudinal fragmentary vertical sectional view along the line 3—3 in FIGURE 4 illustrating a more extensive form of the invention applied to the hydrostatically lubricated ways of a machine.
Figure 4:
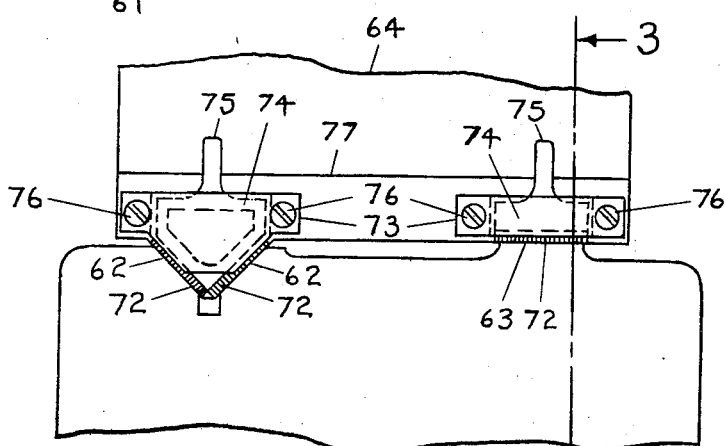
FIGURE 4 is a fragmentary vertical end view further illustrating the invention as shown in FIGURE 3.
Figure 5:
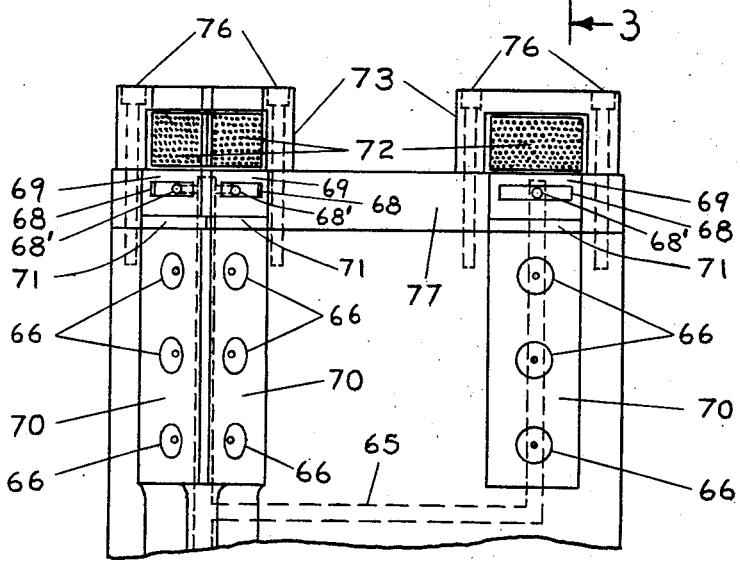
FIGURE 5 is a fragmentary underside plan view of the carriage illustrated in FIGURES 3 and 4.

In FIGURES 3, 4 and 5 the invention is adapted to operating conditions under which the contaminant is more difficult to remove. By way of variation but of no significance to the cleaning device, contoured rather than slot type bearings are illustrated and the cleaning device is formed in a piece separable from the bearing member.

In these figures machine bed 61, in which V- and flat-ways 62 and 63 are formed, supports carriage 64 by means of the above bearings. Supply duct 65 connects, with contoured R1 inlets 66 which spread into film space 67, and connects with plenum grooves 68 through large passages 68'. Lips 69 are essentially level with bearing surfaces 70. Exhaust grooves 71 traverse the bearing surfaces 70 between contours 66 and grooves 68 and are open to the atmosphere or low pressure return, thereby functioning as exhaust ports.

Mohair fabric or felt pads or brushes 72 fit loosely in brackets 73 and are attached to weights 74 and finger tabs 75. Alternately, weights 74 may be replaced by light springs, fluid pressures or other small downward forces. Screws 76 hold brackets 73 against plenum member 77 and member 77 against carriage 64.

In operation, the assembly illustrated in FIGURES 3, 4 and 5 functions as follows. Filtered pressure fluid from duct 65 flows into R1 inlets 66 and into plenum grooves 68. The fluid spreads from contoured inlets 66 into load carrying films 67 and seeps out through the sides of the bearings and out at the ends of the bearings through exhaust ports 71. The fluid also flows at supply pressure from plenum grooves 68 across lips 69 and through brushes 72, at high velocity.

Lips 69 are charatcerized by their exact alignment with the bearing surfaces 70 so that the nozzle clearance T between lips 69 and bearing surfaces 62 and 63 is minimum thereby concentrating and directing the flow against the small particles of contamination on bearing surfaces 62 and 63, thereby conserving fluid energy. The nozzle length, that is the width W of the lips 69, is no smaller than is necessary to provide enough fluid velocity to accelerate the particles above bearing velocity before they are overtaken by the engagement of the bearing surfaces. The foregoing description of the dimensions T and W applies to all of the illustrations.

Exhaust grooves 71 are added only when fluid pressure from groove 68 interferes with the proper functioning of the hydrostatic bearings. That is, grooves 71 isolate regulated load carrying films 67 from the supply pressure in grooves 68.

Brushes 72 at all times contact the opposing bearing surfaces 62 and 63 until they are worn out. Since with hydrostatic bearings there is no need for grooves or scraped indentations to retain oil, bearing surfaces 62 and 63 may be perfectly smooth so that brushes 72 wear very slowly and are highly effective in removing contamination. Preferably brackets 73 are open so that brushes 72 may be easily removed for inspection, cleaning or replacement.

Figure 6:
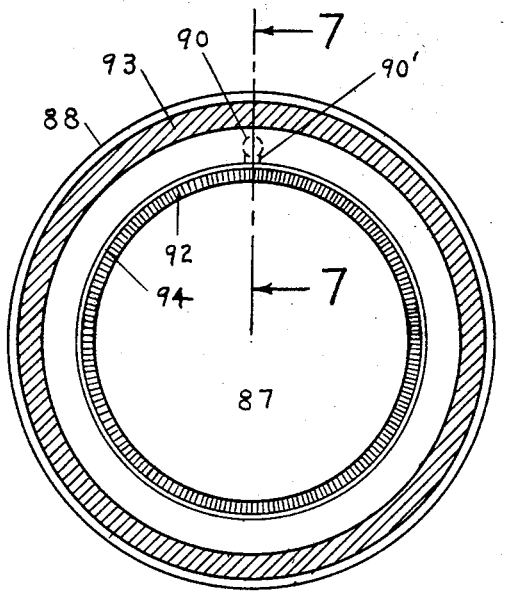
FIGURE 6 is a cross sectional view taken along the line 6—6 in FIGURE 7 of the application of the invention to a linear or rotary bearing.
Figure 7:
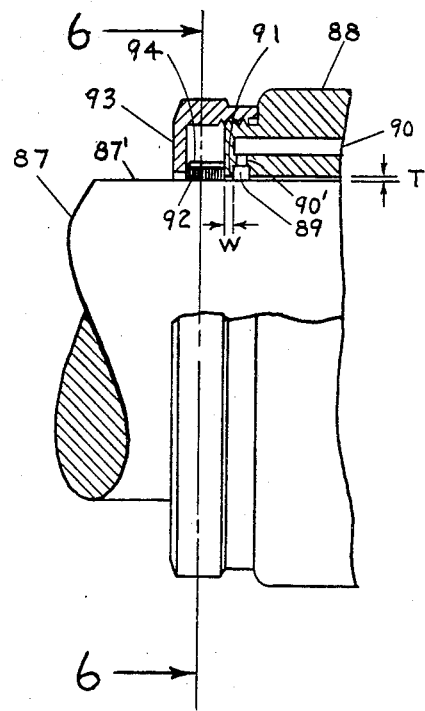
FIGURE 7 is a half sectional view taken along the line 7—7 in FIGURE 6 of the application of the invention shown in FIGURE 6.

In FIGURES 6 and 7 the invention is adapted to a sliding or rotating cylindrical bearing, for example. In these figures shaft 87 is located in housing 88 by any type of bearing, preferably an hydrostatic gas bearing, the bearing providing radial clearance T at lip 91. The plenum groove 89 connects with supply channel 90 through large passage 90' and forms lip 91. Groove 89 is located a small distance W from the edge of the bearing as described above. If needed, brush 92 is held loosely against lip 91 by cap 93. Brush 92 is lightly held in contact with shaft 87 by the elastic backing material or metal spring 94 described in connection with FIGURE 8.

In operation, filtered pressure fluid from distribution passage 90 flows into groove 89, across lip 91 and through brush 92. Again, this flow is concentrated and directed by control of dimensions T and W to most effectively and efficiently remove contamination from the surface of shaft 87, as described in connection with FIGURES 3, 4 and 5 above.

Figure 8:
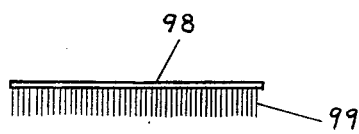
FIGURE 8 is an enlarged edge view of a narrow strip of mohair fabric forming a part of the cleaning device.

The mohair fabric shown in FIGURE 8 is the prefererd material for the brushes described above. This is because the woven backing 98 retains a large number of small resilient fibres 99 which protrude vertically from the backing 98. Where needed, the backing 98 may be woven with elastic thread or be supported by a metal spring, to keep the fibres 99 in contact with the opposite bearing surface as they wear shorter. Alternately, the fibres or bristles 99 may be bent on assembly with the bearing and straighten out as they wear shorter.

In FIGURES 9 and 10 the bearing surface cleaning device is combined with a plane or segmentary spherical, hydrostatic gas bearing capable of random motion over an extended surface, and supporting for example a drill jig on the table of a drill press. The bearing members 100 and 101 have opposed bearing surfaces 102 and 103 the latter surface being more extensive. Surface 102 contains plenum groove 104, exhaust groove 105 and contoured bearing inlet 106 from plenum chamber 107. Tube 108 is designed to connect plenum chamber 107 to a source of pressure gas. Passages 109 vent exhaust groove 105 to the atmosphere or other low pressure receiver thereby providing an exhaust port. Passages 110 connect plenum groove 104 to chamber 107. Cover 111, threaded to member 100, closes chamber 107 and is removable by means of wrench holes 112 for cleaning the gas passages. Load is applied to the bearing through central pivot rod 113 or other connection. Gasket 114 prevents leakage through the screw thread. For greater velocity lip 115 may be contoured as shown in FIGURES 11 or 12.

In operation, tube 108 is connected to a source of pressure gas, usually air, which flows at full pressure through tube 108 in chamber 107. Remaining at full pressure, the flow is then divided between bearing inlet 106 and passages 110 flowing into plenum groove 104. In flowing from inlet 106 to the exhaust port, the gas gradually loses pressure and energy while providing controlled and stabilized separation of the bearing surfaces. From plenum groove 104 the gas flows between lip 115 and surface 103 and issues at high velocity along bearing surface extension 116.

FIGURES 11 and 12 show the contouring of the lip or nozzle of the cleaning device for maximum velocity, for liquids and for gases respectively. These contours are applicable to all of the lips and nozzles described herein.

INTEGRATED NOZZLE

In FIGURES 13 and 14, the nozzle 120 is integrated, is an alternate form of the fluid portion of the cleaning device and is attached to or part of the less extensive member 121 of a bearing. This bearing has extended surface 122 including extension 123, opposed by less extensive surface 124. These surfaces are separated or have a running fit at 125.

Nozzle 120 is formed by body 126 and cap 127 which are held together and against the edge 128 and shoulder 129 of bearing member 121 by screws 130, if edge 128 is straight. If member 121 is round and edge 128, cap 127 and body 126 are circular, cap 127 and body 126 may be held against edge 128 and shoulder 129 by a circular ring threaded to member 121 and bearing downward on the top edge of cap 127.

Elongated plenum 131 may be connected to a source of pressure fluid by passage 132 extending through cap 127, body 126 and bearing member 121. An exhaust port 133 may be provided if necessary to stabilize the bearing, as previously described. For maximum velocity the nozzle 120 is contoured as shown in FIGURES 11 and 12.

In operation passage 132 is connected to a source of pressure fluid which flows at full pressure through passage 132 into plenum 131. The fluid then issues at high velocity through nozzle 120 along bearing surface extension 123 and removes contaminant therefrom at a distance from the nozzle depending on the velocity of relative bearing movement.

Either or both of the opposed bearing members may move in respect to some external frame, depending on the application of the invention. However this invention, particularly as described in the claims, depends only on "relative bearing movement," that is, the movement of one bearing surface in respect to the other.

With particular reference to the plane bearings described herein, it will be understood that for certain applications of the invention any of the combinations of cleaning device and bearing described herein may be inverted or otherwise oriented in respect to gravity or space without departing from the invention.

References herein to hydrostatic bearings are to bearings in which pressure fluid is employed to maintain separation of the opposed bearing surfaces independent of bearing load and relative bearing movement. This type of bearing is further described in U.S. Patents 2,683,635, 2,683,636 and 3,186,774.

Alternately and within the scope of the invention the above described cylindrical bearing and cleaning device illustrated in FIGURES 6 and 7 may have spherical or conical bearing surfaces or a combination of cylindrical and thrust bearing surfaces or the assembly may be radially inverted thereby taking the form of a piston in a cylinder, the cylinder wall being cleaned to protect the piston and cylinder wall from contamination, and the resulting friction and wear.

Also within the scope of the invention a flexible sheet or tape may be drawn over a flat or curved less extensive bearing surface equipped with the above described combination of high velocity air cleaning device and hydrostatic air bearing.

It will be understood that although only one end of the above mentioned carriages riding on machine ways is described and illustrated, the other end will be similarly equipped with a cleaning device where needed to protect the bearing surfaces from contamination. It will be further understood that the V of the V machine ways described above may be inverted.

In summary, the above described cleaning device may be combined with any type of bearing such as antifriction ball or roller bearings or oil lubricated plain bearings but is particularly suited to hydrostatic bearings having an extended bearing surface. Also the opposed surfaces in these combinations of cleaning device and bearing may have any geometric form such as plane, cylindrical, conical, spherical or that of a segment of a geometric figure.

I claim:
1. The combination of an hydrostatic gas bearing having an extended bearing surface to allow movement of the members of said bearing relative to each other, and a nozzle having an exit that is thin and elongated lateral to flow and parallel to said surface, and means for connecting said bearing and said nozzle to a pressure gas source including a filter between said source and said nozzle and between said source and said bearing, said nozzle being directed outwardly from said bearing and along said surface to accelerate contamination from said surface in a distance from the area of engagement of said bearing members, thereby allowing velocity of said movement without said members overtaking and engaging said contamination.

2. The combination of a bearing, a nozzle, connecting means and a pressure gas filter, as claimed in claim 1, in which the size of the openings in said filter are at least as small as the thickness T of the load carrying gas film in said bearing.

3. The combination of a cleaning device and an hydrostatic gas bearing having members with opposed bearing surfaces, one of said surfaces having an extension beyond the other surface, said extension providing bearing movement that reduces said extension in at least one direction from said other surface, said combination including an elongated plenum groove positioned in and close to an edge of said other surface thereby forming a lip between said groove and said edge, a thin opening between said lip and said extended bearing surface, said edge being essentially perpendicular to and facing in said direction so that said opening is in said direction, means for connecting said bearing to a source of pressure gas, and means for connecting said plenum groove to a source of pressure gas, to provide a thin high velocity sheet of gas flowing in said direction along said surface extension, and an elongated exhaust port positioned in said other bearing surface approximately parallel to said plenum groove and between said groove and the outward flowing pressure gas film between said bearing surfaces, to limit and stabilize the thickness of said film.

4. The combination of a cleaning device and an hydrostatic gas bearing as claimed in claim 3 including a fine open brush and means retaining said brush across the front of said thin opening and in contact with said surface extension, for brushing said extended surface by means of said bearing movement.

5. The combination of an hydrostatic gas bearing having an extended bearing surface to allow movement of the members of said bearing relative to each other, and a nozzle having an exit that is thin and elongated lateral to flow and parallel to said surface, and means for connecting said bearing and said nozzle to a pressure gas source, said nozzle being directed outwardly from said bearing and along said surface to accelerate contamination from said surface in a distance from the area of engagement of said bearing members, thereby allowing velocity of said movement without said members overtaking and engaging said contamination, said combination including another bearing surface opposed to said extended bearing surface, and an elongated exhaust port positioned in said other surface approximately parallel to said nozzle and between said nozzle and the outward flowing pressure gas film between said surfaces, to stabilize the thickness T of said film.

6. The combination of a bearing having a plane unobstructed bearing surface traversing and for traversal of an area of engagement of a member of said bearing opposed to said bearing surface, said surface extending beyond said opposed member, and a cleaning nozzle having an exit that is thin and elongated lateral to nozzle flow, and means for connecting said nozzle to a pressure fluid source, and means positioning said nozzle exit close to and parallel with said extended bearing surface and near an edge of said opposed bearing member and directing the stream from said nozzle outward from said area of engagement in opposition to said traversal and along said bearing surface extension to accelerate contamination from said surface in a distance from said area of engagement, thereby allowing velocity of said traversal without said opposed bearing member overtaking and engaging said contamination, said engagement resulting in bearing wear and loss of accuracy, and to avoid seal friction.

7. The combination of a cleaning device and a bearing as claimed in claim 6, including a fine open brush and means retaining said brush across the front of said nozzle exit and in contact with said bearing surface extension, for brushing said extended surface by means of said bearing movement.

8. The combination of a cleaning device and a bearing as claimed in claim 6, in which said means for connecting said nozzle to a pressure fluid source includes a filter between said source and said nozzle.

9. The combination of a bearing and a cleaning device as claimed in claim 7, in which the size of the openings in said filter is not appreciably greater than the clearance between the bearing surfaces in said bearing.

10. The combination of a bearing, a nozzle and means for connecting said nozzle to a pressure fluid source as claimed in claim 1, in which said bearing is an hydrostatic gas bearing, said pressure fluid is a gas, and said combination includes means for connecting said bearing to a pressure gas source.

11. The combination of a cleaning nozzle and a bearing having members with opposed surfaces, one of said surfaces being plane and traversing and extending beyond the other surface, said extended surface providing unobstructed traversal that reduces said surface extension in at least one direction from said other bearing surface, said combination including an elongated plenum groove positioned in and close to an edge of said other surface thereby forming a lip between said groove and said edge, a thin opening between said lip and said extended surface forming said nozzle, said edge being positioned so as to direct said nozzle in said direction, and means for connecting said plenum groove to a source of pressure fluid, to provide a thin high velocity fluid sheet flowing in said direction along said bearing surface extension.

12. The combination of a cleaning nozzle and a bearing as claimed in claim 3, in which said bearing is lubricated with a liquid and said fluid is a liquid, and means for connecting said bearing to said pressure source.

13. The combination of a liquid lubricated bearing and a cleaning nozzle as claimed in claim 12, in which an exhaust port is positioned in said other surface between said plenum groove and the liquid film lubricating said surfaces, to stabilize the thickness of said film.

14. The combination of a bearing, a cleaning nozzle and fluid connecting means, as claimed in claim 3, in which said bearing is an hydrostatic gas bearing and said fluid is a gas, and means for connecting said bearing to a source of pressure gas.

15. The combination of a cleaning device and an hydrostatic gas bearing as claimed in claim 3 in which said two sources are one source.

16. The combination of a cleaning device and an hydrostatic gas bearing as claimed in claim 13, including a fine open brush, and means retaining said brush across the front of said thin opening and in contact with said surface extension, for brushing said extended surface by means of said bearing movement.

17. The combination of a cleaning device and a bearing having bearing members with opposed surfaces, one of said surfaces traversing and extending beyond the other surface and being plane, said extended surface providing unobstructed bearing traversal that reduces said surface extension in at least one direction from said other bearing surface, said combination including an integrated nozzle having a thin opening elongated laterally to its flow, means positioning said nozzle opening near an edge of said other surface and parallel and close to said extended surface, said edge and said positioning means directing said nozzle outward from said edge along said surface extension in said direction, and means for connecting said nozzle to a source of pressure fluid, to provide a thin high velocity fluid sheet flowing in said direction along said bearing surface extension.

18. The combination of a cleaning device and a bearing as claimed in claim 1 in which said bearing is lubricated with a liquid and said fluid is a liqud, and means for connectng said bearing to said pressure source.

19. The combination of a cleaning device and a liquid bearing as claimed in claim 14 including a fine open brush and means retaining said brush across the front of said thin opening and in contact with said surface extension, for brushing said extended surface by means of said bearing movement.

20. The combination of a cleaning device, fluid connecting means and a bearing as claimed in claim 1, in which said bearing is an hydrostatic gas bearing and said fluid is a gas, and means for connecting said bearing to a source of pressure gas.

21. The combination of a cleaning device and an hydrostatic gas bearing as claimed in claim 2 in which said two sources are one source.

22. The combination of a cleaning device and a bearing as claimed in claim 15, including a fine open brush, and means retaining said brush across the front of said thin opening and in contact with said surface extension, for brushing said extended surface by means of said bearing movement.

23. The combination of a cleaing device and an hydrostatic gas bearing as claimed in claim 2, in which an elongated exhaust port is positioned in said other bearing surface approximately parallel to said nozzle opening and between said nozzle opening and the outward flowing pressure gas film between said bearing surfaces, to limit and stabilize the thickness of said film.

24. The combination of a cleaning device and an hydrostatic gas bearing as claimed in claim 6 including a fine open brush and means retaining said brush across the front of said thin opening and in contact with said surface extension, for brushing said extended surface by means of said bearing movement.

25. The combination of a cleaning nozzle and a bearing having bearing members with opposed surfaces, one of said surfaces having an extension beyond the other surface, said extension providing bearing movement that reduces said extension in at least one direction from said other surface, said combination including an elongated plenum groove positioned in and close to an edge of said other surface thereby forming a lip between said groove and said edge, a thin opening between said lip and said extended surface, said edge being essentially perpendicular to and facing in said direction so that said opening is in said direction, and means for connecting said plenum groove to a source of pressure fluid, to provide a thin high velocity fluid sheet flowing in said direction along said surface extension, and said combination including a fine open brush and means retaining said brush across the front of said thin opening and in contact with said surface extension, for brushing said extended surface by means of said bearing movement.

26. The combination of a cleaning nozzle and a bearing as claimed in claim 25, in which said bearing is an hydrostatic gas bearing and said fluid is a gas, and means for connecting said bearing to a source of pressure gas.

27. The combination of a cleaning device and a bearing having bearing members with opposed surfaces, one of said surfaces having an extension beyond the other surface, said extension providing bearing movement that reduces said extension in at least one direction from said other surface, said combination including an integrated nozzle having a thin opening elongated laterally to its flow, means positioning said nozzle opening near an edge of said other surface and parallel and close to said extended surface, said edge and said positioning means pointing said nozzle outwardly from said edge along said surface extension in said direction, and means for connecting said nozzle to a source of pressure fluid, to provide a thin high velocity fluid sheet flowing in said direction along said surface extension, and said combination including a fine open brush and means retaining said brush across the front of said thin opening and in contact with said surface extension, for brushing said extended surface by means of said bearing movement.

28. The combination of a cleaning device and a bearing as claimed in claim 27, in which said bearing is an hydrostatic gas bearing and said fluid is a gas, and means for connecting said bearing to a source of pressure gas.

References Cited

UNITED STATES PATENTS

| 1,957,054 | 5/1934 | Waldorf | 308—187.2 |
| 2,125,446 | 8/1938 | Hurtt | 308—36.3 |
| 3,166,361 | 1/1965 | Panzer et al. | 308—5 |
| 932,738 | 8/1909 | Wilson | 15—405 |

MARTIN P. SCHWADRON, Primary Examiner

FRANK SUSKO, Assistant Examiner

U.S. Cl. X.R.

308—5, 9